United States Patent
Sugita et al.

[11] Patent Number: 6,101,051
[45] Date of Patent: Aug. 8, 2000

[54] INFORMATION RECORDING AND UPDATING METHOD, INFORMATION RECORDING AND UPDATING APPARATUS, RECORDING MEDIUM INITIALIZING APPARATUS AND RECORDING MEDIUM

[75] Inventors: Takehiro Sugita, Kanagawa; Akira Ogino, Chiba; Takashi Usui, Tokyo, all of Japan

[73] Assignee: Sony Corporation, Tokyo, Japan

[21] Appl. No.: 08/974,628

[22] Filed: Nov. 19, 1997

[30] Foreign Application Priority Data

Dec. 9, 1996 [JP] Japan ................... 8-344663

[51] Int. Cl.[7] ............... G11B 25/04; G06K 7/08
[52] U.S. Cl. ................. 360/2; 235/449
[58] Field of Search ................ 360/2, 48, 53; 235/384, 449, 493; 705/417

[56] References Cited

U.S. PATENT DOCUMENTS 5,177,344   1/1993   Pease ........................ 235/493
5,719,937   2/1998   Warren et al. ............... 360/60

*Primary Examiner*—W. Chris Kim
*Attorney, Agent, or Firm*—Jay H. Maioli

[57] ABSTRACT

When an information signal recorded in a magnetic card is updated by an information recording and updating apparatus, a spectrum spread signal corresponding to the updated information signal is generated and it is then recorded superimposed on to the information recorded previously in the magnetic card without erasing the old information. Since the information is spectrum spread, alteration is difficult. Moreover, the magnetic card may be discriminated whether it may be used or not by considering the old information recorded in the magnetic card when it is used.

13 Claims, 10 Drawing Sheets

FIG. 4
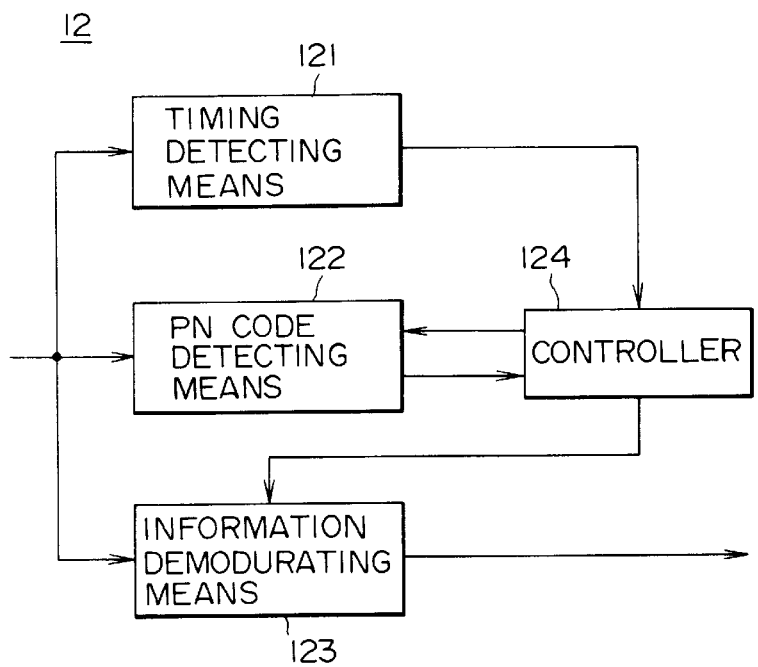
FIG. 5A  TIMING SIGNAL
FIG. 5B  PN CODE STREAM
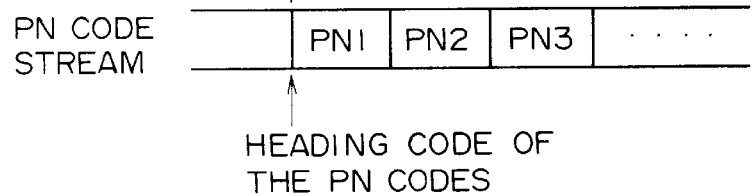
HEADING CODE OF THE PN CODES

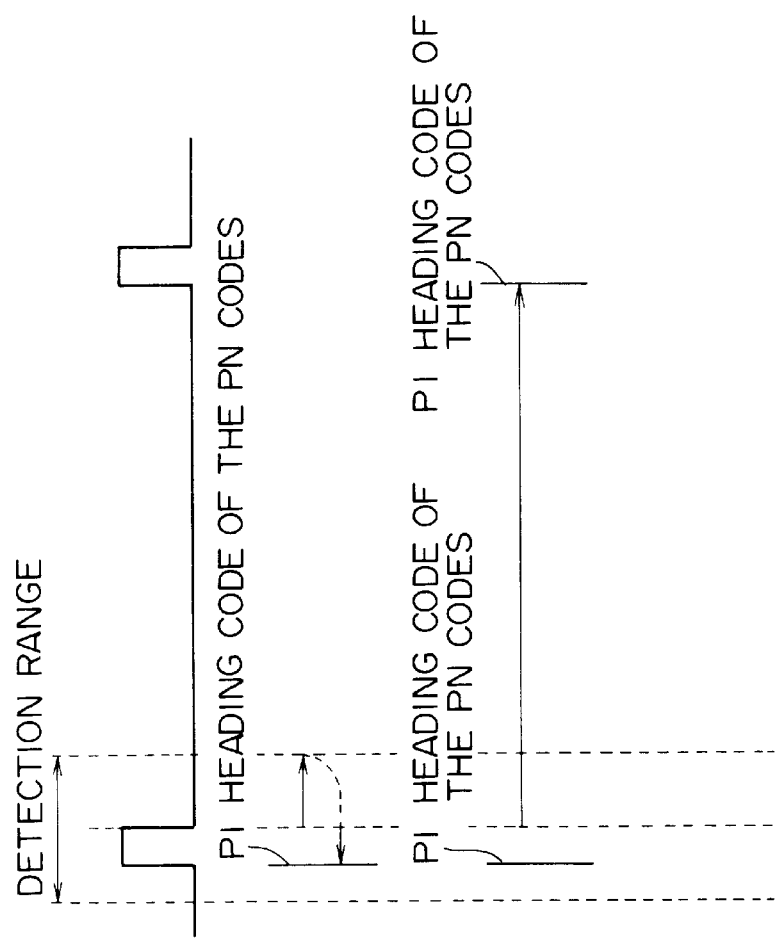

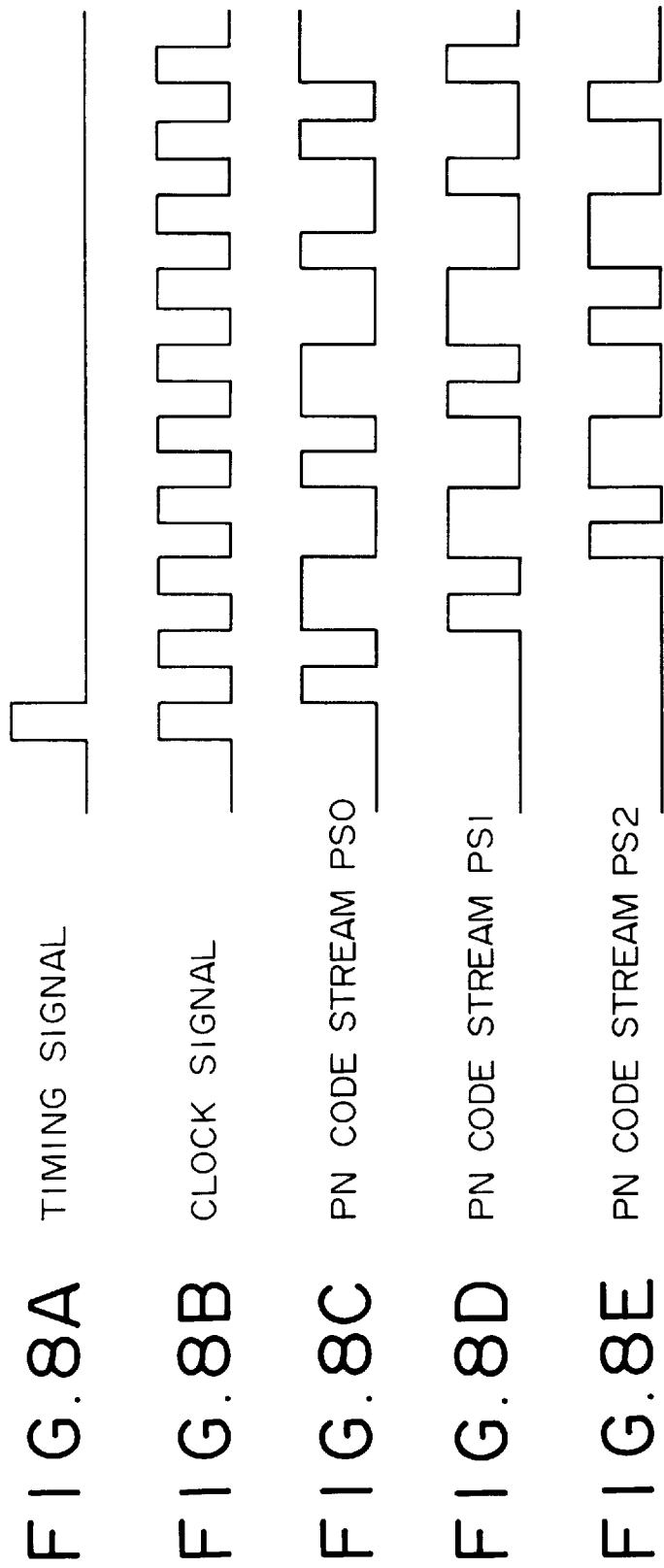

FIG. 9

| INITIALIZATION INFORMATION |
|---|
| AMOUNT OF MONEY (INITIAL VALUE) |
| AMOUNT OF MONEY (AFTER FIRST UPDATE) |
| AMOUNT OF MONEY (AFTER SECOND UPDATE) |
| ⋮ |

PN CODE STREAM PS

LEVEL VARIED
PN CODE STREAM PD

INFORMATION RECORDING AND UPDATING METHOD, INFORMATION RECORDING AND UPDATING APPARATUS, RECORDING MEDIUM INITIALIZING APPARATUS AND RECORDING MEDIUM

BACKGROUND OF THE INVENTION

1. Field of the Invention

The present invention relates to a method and an apparatus for preventing wrong use of a magnetic recording medium such as an advance payment card, for example, which is generally called a prepaid card.

2. Description of the Related Art

A card (magnetic card) in which information is recorded by the magnetic recording system has been used in various fields. For example, in a prepaid card (advance payment card) used for a public telephone set and an automatic ticket selling machine, various pieces of information such as available metering rates and amount of money information equivalent to the payment are recorded. Upon purchasing of this prepaid card, a telephone call can be made and a ticket can also be purchased using the prepaid card without use of small money.

In this case, the available metering rate and amount of money information recorded in the prepaid card are updated to the latest information each time when the prepaid card is used.

Such update process is performed using, for example, a prepaid card (magnetic card) update apparatus as shown in FIG. 1. This update apparatus is mounted within the apparatus which can use a prepaid card, for example, such as a public telephone set an automatic ticket selling machine, etc.

As shown in FIG. 1, signal (information) recorded in the magnetic card 50 is read by a reading means 1 and is then supplied to an information extracting means 2. The information extracting means 2 extracts digital information presenting available metering rate and amount of money information from the signal supplied and then supplies the digital information to an information updating means 3.

The information updating means 3 outputs the detected information, for example, to a display unit (not shown) and also receives the update information corresponding to use. For example, in the case of the prepaid card used for the public telephone set, the information updating means 3 outputs a metering rate information read from the magnetic card and receives the update information such as the metering rate or reduction amount of metering rate after the metering rate used is subtracted by making a telephone call.

Next, the information updating means 3 generates the information updated depending on the update information received and supplies this updated information to a recording information generating means 4. The recording information generating means 4 generates a recording information including addition of header and an error correcting code and then outputs this recording information to a signal recording means 5. The signal recording means 5 newly records the information into the magnetic card 50.

As explained above, in the case of the prepaid card, for example, a user can receive various services such as telephone call from the public telephone set and shopping, as explained above, depending on the information recorded in the prepaid card by using this prepaid card.

In the case of a magnetic card such as a prepaid card explained previously, the information updating means 3 of the update apparatus shown in FIG. 1 is often controlled by a software. Therefore, information such as the available metering rate and amount of money information can easily be altered only by obtaining the update apparatus and then reprogramming the program installed in the information updating means 3.

Moreover, without relation to the update apparatus explained above, it is also possible that information of the magnetic card is rewritten unjustly to use it illegally by detecting information format recorded in the magnetic card.

Recently, various kinds of prepaid cards which may be used in a playground or an ordinary retailing shop in addition to the public telephone set and automatic ticket selling machine is also increasing. Moreover, various magnetic cards are used in various fields, for example, such as member card in which a personal information is recorded or a key card used in the hotel.

Therefore, it is a very important problem to effectively prevent altering of information recorded in the recording medium like a magnetic card for the purpose of wrong use.

SUMMARY OF THE INVENTION

It is therefore an object of the present invention to effectively prevent wrong use of a recording medium such as a magnetic card.

In view of solving the problems explained above, an information recording and updating method of the present invention comprises the steps of:

reading signals recorded in a recording medium;

detecting a spectrum spread information from the signal read in the reading step;

updating the information detected in the detecting step;

generating a spectrum spread signal depending on the information updated in the updating process;

superimposing the spectrum spread signal generated in the spectrum spread signal generating step to the signal read in the reading step; and recording the signal formed by the process of the superimposing step to the recording medium.

According to one aspect of the present invention, an information recording and updating method is characterized in that an initialized information which can be written only with an initializing apparatus is recorded on a recording medium at the time of initialization with the same initializing apparatus.

According to another aspect of the present invention, an information recording and updating method is characterized in that the recording medium is discriminated whether it is regular or irregular medium based on the history of update obtained from the information detected by the detecting step and when the medium is discriminated as irregular medium, the process for disabling its use is executed.

According to another aspect of the present invention, an information recording and updating method is characterized in that the process for disabling its use is executed when the initialized information is not detected by the detecting step.

Moreover, according to another aspect of the present invention, an information recording and updating method is characterized in that the method includes a level changing step for changing a power level of the spectrum spread signal generated in the spectrum spread signal generating step using a desired random number.

According to another aspect of the present invention, an information recording and updating method is an information updating method comprising a step for generating a timing signal which indicates the start timing of generation of the spread code used for detection of the spectrum spread signal to superimpose the timing signal to the signal to be recorded in the recording medium According to an information recording and updating method of the present invention, information read and updated from the recording medium is subjected to spectrum spread. This spectrum spread signal is superimposed on the information read by the reading step and is then recorded to the recording medium.

Thereby, since the newly updated spectrum spread information superimposed and recorded on the information previously recorded in the recording medium, the old information is never erased. Therefore, the latest information can be recorded together with the history in the past.

Moreover, the information to be recorded in the recording medium is spectrum spread. Therefore, if the spectrum spread information is to be altered for use, the spectrum spread information is detected through inverse spread and it is once erased and then wrong information is recorded through the spectrum spread in order to alter the information. Therefore, information recorded in the recording medium becomes too difficult to be altered.

Meanwhile, according to an information recording and updating method of the present invention, a spectrum spread initialized information which may be written only with the initializing apparatus is recorded in the recording medium.

Since the initialized information is spectrum spread, it is difficult to alter this information. Moreover, as is explained above, when an information signal is to be updated, the updated information is spectrum spread and after it is superimposed on the information read from the recording medium it is then recorded to the recording medium. Namely, only the updated information is superimposed in the recording medium. Therefore, the initialized information is never erased under the normal use.

According to an information recording and updating apparatus of the present invention, the updated information is spectrum spread and is recorded in the recording medium in such a manner as it is superimposed on the old information. Therefore, the recording medium is discriminated whether it is regular or irregular on the basis of the history of update obtained from the information detected in the detecting step. For example, when mismatching is generated in the history in the past, the information being recorded in the relevant recording medium may be discriminated as it is probably altered.

When the recording medium is discriminated as irregular medium, the process for disabling the use of such recording medium is performed in such a manner that the update process is suspended, such recording medium is collected or an alarm tone or alarm message is issued.

Thereby, use of the recording medium of which recorded information may be altered can be prevented effectively.

Moreover, according to the information recording and updating method of the present invention, the initialized information is protected from erasure under ordinary use thereof so long as the information is not overwritten on the recording medium. In addition, the initialized information can be written only with the initializing apparatus. Therefore, if the initialized information to be recorded in the recording medium is not detected, it is discriminated that the information recorded in the recording medium is already altered and the process of disabling the use of the recording medium is executed in such a manner that the update process is suspended, relevant recording medium is collected or an alarm is issued.

Therefore, use of the recording medium in which the recorded information may be altered can surely be prevented effectively.

Moreover, according to an information recording and updating method of the present invention, a power level of the spectrum spread signal generated in the spectrum spread signal generating step is changed at random using a desired random number.

Therefore, generation of a signal to erase the spectrum spread signal is disabled to effectively prevent alteration of information such as erasure of the latest spectrum spread signal.

In addition, according to the information recording and updating method of the present invention, a timing signal indicating the start timing for generation of spread code used for detection of the spectrum spread signal is recorded in the recording medium in such a manner as it is superimposed on the spectrum spread signal. This timing signal indicates the start timing for generation of the spread code used for spectrum spread.

Therefore, in the case of detecting the spectrum spread information recorded in a relevant recording medium, the spread code can be generated in the timing which is almost same as the spread code for the spectrum spread of information by generating the spread code based on this timing signal.

Accordingly, the spread code used for the spectrum spread can be detected easily and the spectrum spread information can be detected quickly.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 4 is a block diagram for explaining a spectrum spread signal detecting means of an information recording and updating apparatus shown in FIG. 2;

FIGS. 5A and 5B are diagrams for explaining relationship between a timing signal and a, PN code stream;

FIGS. 7A to 7C are diagrams for explaining the process when the PN code detection range is set;

FIGS. 8A to 8E are diagrams for explaining the PN code streams in difference phases;

FIG. 9 is a diagram for explaining the condition of information being recorded in the magnetic card by the information recording and updating apparatus of the present invention;

DESCRIPTION OF THE PREFERRED EMBODIMENT

With reference to the accompanying drawings, respective preferred embodiments of the information recording and updating method, information recording and updating apparatus, recording medium initialization apparatus and recording medium of the present invention will be explained.

Figure 1:
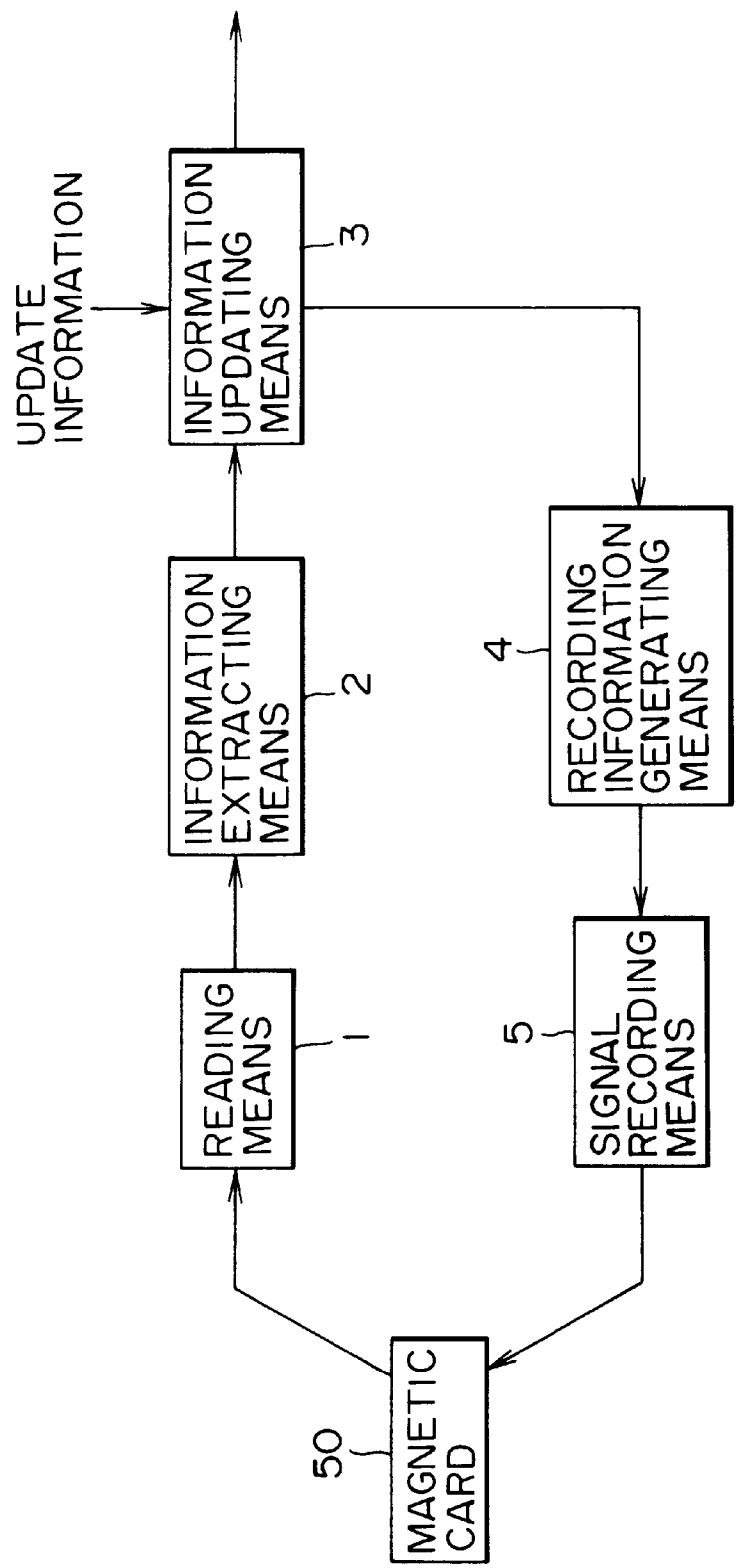
FIG. 1 is a block diagram for explaining an example of a magnetic card updating apparatus of the related art.
Figure 2:
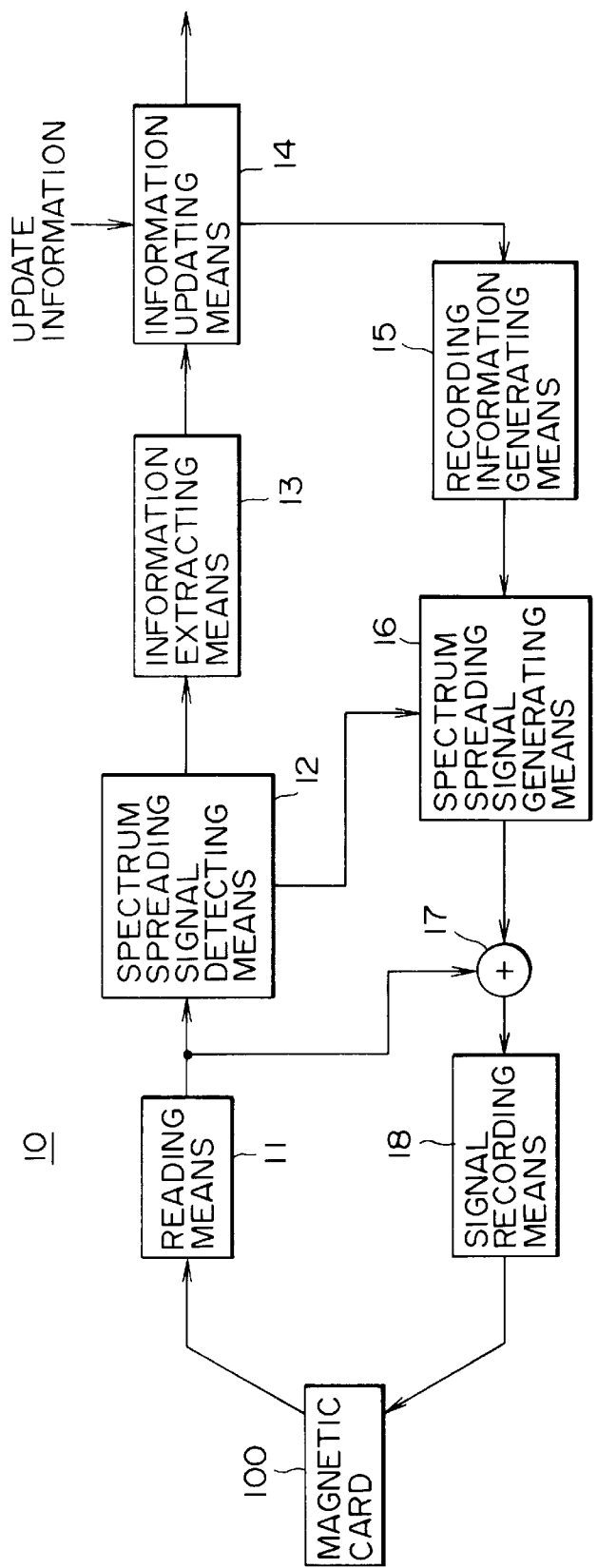
FIG. 2 is a block diagram for explaining a preferred embodiment of an information recording and updating apparatus of the present invention.

FIG. 2 is a block diagram for explaining the information recording and updating apparatus 10 of the present embodiment. The information recording and updating apparatus 10 shown in FIG. 2 updates the information recorded in a magnetic card 100 each time when the magnetic card is used, spreads the spectrum of the updated information using the PN (Pseudorandom Noise) code stream as the spread code and records the updated information in the magnetic card 100 by superimposing the information on in the old information.

Figure 3:
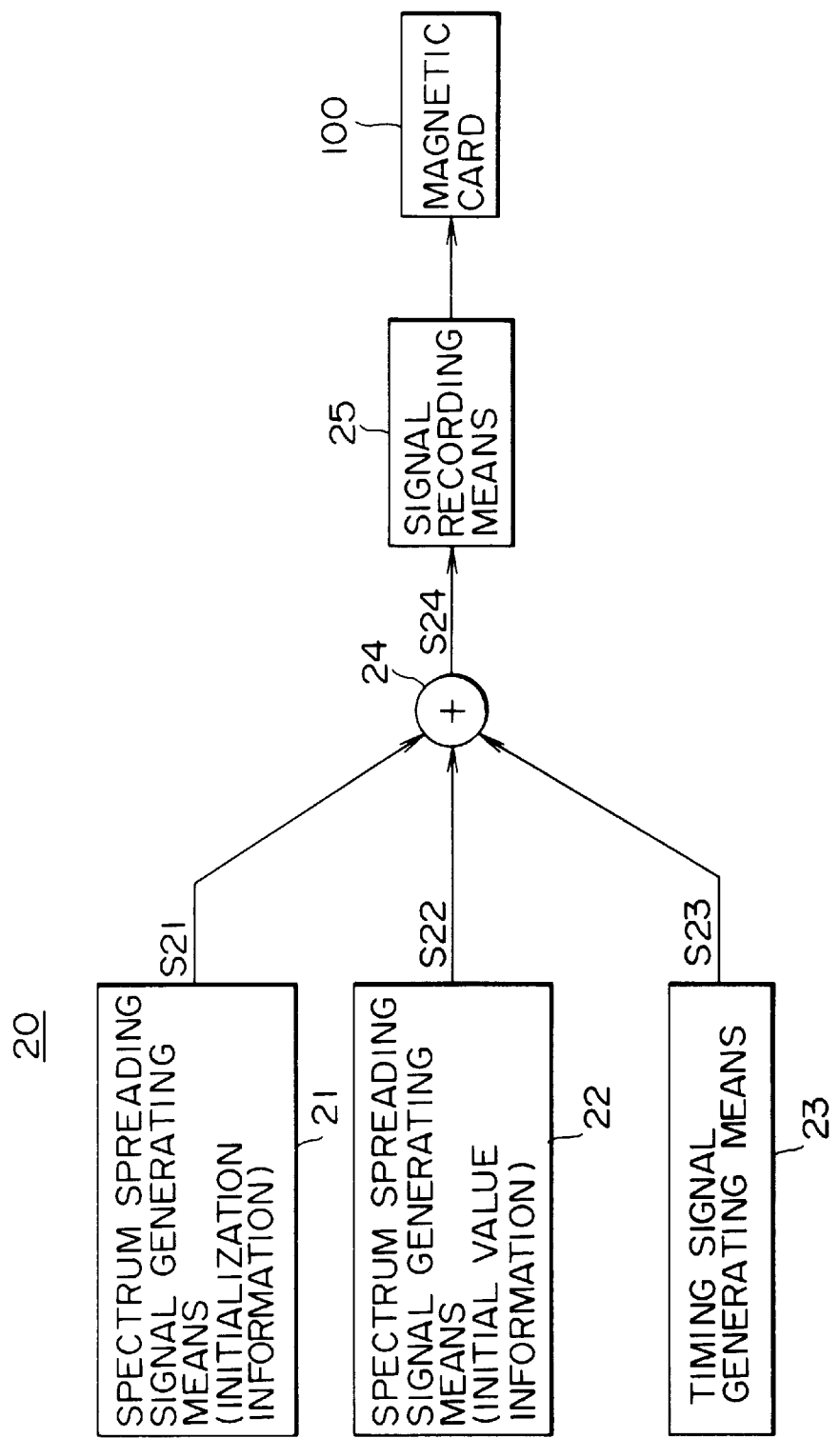
FIG. 3 is a block diagram for explaining an embodiment of an initialized information setting apparatus of the present invention.

FIG. 3 is a block diagram for explaining a recording medium initializing apparatus of the present invention. The recording medium initializing apparatus 20 records the initial value in the magnetic card to generate an available magnetic card in the information recording and updating apparatus 10 shown in FIG. 2.

In this embodiment, the magnetic card 100 as a recording medium is used as a prepaid card and the amount of money information which is updated each time when the card is used is assumed to be recorded as an information signal.

First, referring to FIG. 3, the recording medium initializing apparatus 20 for generating a magnetic card which is available in the information recording and updating apparatus shown in FIG. 2 will be explained.

As shown in FIG. 3, the recording medium initializing apparatus 20 comprises spectrum spread signal generating means 21, 22, timing signal generating means 23, adding means 24 and signal recording means 25.

The spectrum spread signal generating means 21 generates the PN code stream which may be written only in this recording medium initializing apparatus 20. In this case, the PN code stream generated by the spectrum spread signal generating means 21 is an information (hereinafter referred to as the initialized information) which can be written only at the time of initialization of the recording medium initializing apparatus. The PN code stream generated is supplied to the adding means 24 as the spectrum spread signal S21 corresponding to the initialized information.

As the spectrum spread signal S21, the PN code stream having 0 phase, for example, for the timing signal explained later is used as the PN code stream and the information is not spread by this PN code stream. In other words, information cannot be obtained when the PN code stream of 0 phase is inversely spread. Namely, when the PN code stream of 0 phase not including the information is detected, the initialized information may be detected.

In the information recording and updating apparatus explained later, the updated information is spectrum spread by the PN code and information can always be recorded. In this sense, the PN code stream of the particular phase not including any information can be recorded only by this recording medium initializing apparatus 20.

The spectrum spread signal generating means 22 generates a spectrum spread signal corresponding to the initial value of the amount of money information to be recorded in the magnetic card 100. The amount of money information is spectrum spread by the PN code stream to generate a spectrum spread signal S22.

The PN code stream used in the spectrum spread signal generating means 22 is common in the series of with the PN code stream used in the spectrum spread signal generating means 21 but is different in the phase therefrom. The spectrum spread signal S22 generated is then supplied to the adding means 24.

The timing signal generating means 23 generates a timing signal S23 which indicates the start timing for generation of the PN code stream used when the spectrum spread signal generated in the spectrum spread signal generating means 21, 22 is used. Namely, this timing signal S23 indicates the timing for starting generation of the PN code stream, from the heading code thereof, having the predetermined code pattern used for spectrum spread.

For detection of the spectrum spread signal, the inverse spread must be performed using the PN code stream used for the spectrum spread and the PN code stream for inverse spread of the same code pattern generated in the same timing. When spread coefficient of the spectrum spread is set to a very large value, it becomes very difficult to detect the PN code stream used for the spectrum spread.

Therefore, the timing signal S23 generated by the timing signal generating means 23 is used, to quickly start the inverse spectrum spread, as a synchronous signal for synchronizing the PN code stream used for spectrum spread and the PN code stream for inverse spectrum spread. The timing signal S23 is supplied to the adding means 24.

The adding means 24 forms a signal S24 in which the spectrum spread signal S21, spectrum spread signal S22 and timing signal S23 are superimposed and then supplies this signal S24 to signal recording means 25. The signal recording means 25 records the signal S24 on the magnetic card 100.

As explained, the recording medium initializing apparatus 20 generates a magnetic card 100 which may be used by recording therein the signal S24 in which the spectrum spread signal S21 corresponding to the initialized information, the spectrum spread signal S22 corresponding to the initial value of the amount of money information and the timing signal S23 are superimposed.

As explained previously, the initialized information and amount of money information are respectively recorded in the magnetic card 100 by superimposing the spectrum spread signals S21, S22 generated using the PN code streams in the different phases. Since each information is spectrum spread, such information cannot be extracted, if spectrum spread is not executed. Therefore, the amount of money information cannot be read easily and accordingly secrecy of information can be enhanced and alteration of amount of money information becomes difficult as explained previously.

In addition, the spectrum spread signal S21 is formed using the PN code stream which can be written only in the recording medium initializing apparatus 20. Therefore, when the amount of money information is improperly updated by overwriting the altered amount of money information in the magnetic card 100, the initialized information is erased by the newly recording information.

Therefore, if the spectrum spread signal S21 corresponding to the initialized information is not detected at the time of updating the data in the information recording and updating apparatus 10 shown in FIG. 2, as will be described later, use of the magnetic card is inhibited, for example, to prevent use of the magnetic card of which information is improperly altered.

Next, referring to FIG. 2, the information recording and updating apparatus 10 for executing the update process to the magnetic card 100 generated by the recording medium initializing apparatus shown in FIG. 3 will then be explained.

The information recording and updating apparatus 10 shown in FIG. 2 executes spectrum spread for the updated amount of money information and then superimposes this updated amount of money information to the information recorded in the magnetic card 100 in order to record the latest updated amount of information together with the initialized information and the amount of money information before update into the magnetic card.

As shown in FIG. 2, the information recording and updating apparatus 10 comprises reading means 11, spectrum spread signal detecting means 12, information extracting means 13, information updating means 14, recording information generating means 15, spectrum spread signal generating means 16, an adding means 17 and signal recording means 18.

The reading means 11 reads the signals recorded in the magnetic card 100 and then supplies the signals to the spectrum spread signal detecting means 12 and adding means 17.

The spectrum spread signal detecting means 12 detects the spectrum spread signal in the signals supplied. FIG. 4 is a diagram for explaining a structure of the spectrum spread signal detecting means 12.

As shown in FIG. 4, the spectrum spread signal detecting means 12 comprises timing detecting means 121, PN code detecting means 122, information demodulating means 123 and control means 124. The signals supplied to the spectrum spread signal detecting means 12 are then supplied to the timing detecting means 121, PN code detecting means 122 and information demodulating means 123.

The timing detecting means 121 detects the timing signal superimposed on the signals supplied and then informs the control means 124 of the detection result. The control means 124 controls the PN code detecting means 122 when the detection result from the timing detecting means 121 is the signal indicating that the timing signal is detected, causing the spectrum spread signal superimposed on the signal supplied to the PN code detecting means 122 to detect the spectrum spread PN code stream.

As the PNcode detecting means 122, a sliding correlator, for example, can be used. The PN code detecting means 122 generates the PN code stream on the basis of the control signal from the control means 124 and detects the PN code stream spectrum spreading the spectrum spread signal in the signals supplied. The detection result is then supplied to the control means 124

When the detection result from the PN code detecting means 122 notifies that the PN code stream is detected in the signals supplied to the PN code detecting means 22, the control means 124 controls the information demodulating means 123 to demodulate the information superimposed in the signal from the reading means 11.

The information demodulating means 123 generates the PN code stream depending on control from the control means 124 and executes inverse spectrum spread to demodulate the information superimposed as the spectrum spread signal to the signals supplied from the reading means 11. The demodulated information is supplied to the information extracting means 13.

As explained above, the spectrum spread signal corresponding to the initialized information and the spectrum spread information corresponding to the amount of money information are formed by using the PN code streams which are in the same series but is different in the phase from each other. Therefore, the spectrum spread signal detecting means 12 generates a plurality of PN code streams in different phases and executes detection of the PN code and inverse spectrum spread using such PN code streams in order to demodulate every information recorded in the magnetic card 100 by the superimposing method.

When the PN code streams are not detected at all or when the PN code stream corresponding to the initialized information recorded in the recording medium initializing apparatus 20 explained above is not detected, the magnetic card 100 is judged whether the card is not generated by the recording medium initializing apparatus 20 or information recorded on the irregular magnetic card has been altered.

The control means 124 executes the process for disabling the use of the magnetic card 100, for example, the demodulation of information is not executed in the information demodulating means 123 in view of preventing wrong use of the magnetic card when information recorded is altered.

Moreover, the spectrum spread signal detecting means 12 detects, as shown in FIGS. 5A and 5B, the timing signal and generates the PN code stream for PN code detection depending on the timing signal. As explained previously, the timing signal indicates the timing for starting generation of the PN code stream used for generation of the spectrum spread signal in the recording medium initializing apparatus 20. In this embodiment, the PN code stream (FIG. 5B) is generated with reference to the falling edge of the timing signal (FIG. 5A).

In the spectrum spread signal detecting means 12, the PN code for PN code detection can be generated almost in the same timing as the PN code stream used for generation of the spectrum spread signal superimposed on the signal supplied from the reading means 11. Thereby, in the information recording and updating apparatus 10, the timing for starting generation of the PN code stream spectrum spreading the spectrum spread signal is limited to a narrow range to detect the PN code stream spectrum spreading the spectrum spread signal.

Figure 6A:
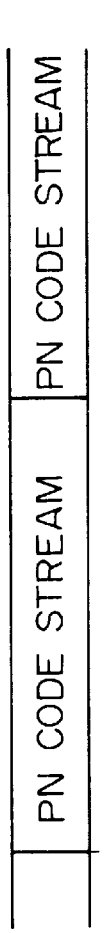
FIGS. 6A to 6C are diagrams for explaining a PN code detection range.
Figure 6B:
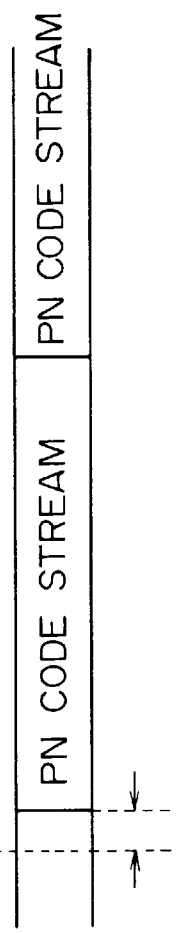
Figure 6C:
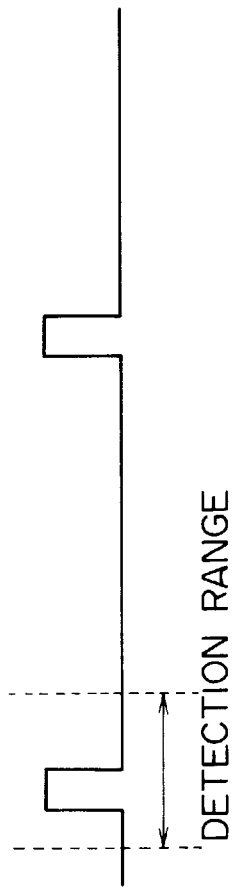

Namely, the detection range of the PN code stream used for generation of the spectrum spread signal is set with reference to the timing signal as shown in FIG. 6C, considering that the timing (FIG. 6A) for starting generation of the PN code stream for spectrum spreading the spectrum spread signal is delicately deviated from the timing (FIG. 6B) for starting generation of the PN code stream for PN code detection.

This detection range is set, if deviation is generated, in such a manner that the heading code of the PN code stream surely exists. The PN code detecting process in the PN code detecting means 122 shown in FIG. 4 is executed for the preset detecting range. In this embodiment, the detecting range is set to have the same time width in the delaying direction and leading direction with reference to the falling edge of the timing signal as shown in FIGS. 7A to 7C.

Thereby, the PN code stream can be detected quickly even when the heading code P1 of the PN code stream spectrum spreading the spectrum spread signal is deviated in the delaying direction with reference to the falling edge of the timing signal detected by the PN code detecting means 122 as shown in FIG. 7B.

In this case, the PN code detecting process is executed in the leading direction within the detecting range with reference to the rising edge of the timing signal as shown in FIG. 7B. When the PN code is not detected in the detecting process in the leading direction, the PN code detecting process is executed in the delaying direction in the preset detection range with reference to the falling edge of the timing signal.

Thereby, when the PN code detecting process is executed in the leading direction with reference to the falling edge of the timing signal without setting the PN code detecting range as shown in FIG. 7C, the time required for the PN code detecting process can be shortened in comparison with that required when the PN code stream detecting process is executed until the heading code of the next PN code stream is detected.

When the detecting range is set for detection of the PN code stream as explained above, the detecting range can be set under the control of the control means 124.

When the detecting range is set as explained above, the time required for detecting process can be shortened because the detecting range can be narrowed considerably in comparison with that in the detection of the PN code stream for one period of the PN code stream.

The information extracting means 13 extracts the smallest amount of money information from the information supplied and then supplies this information to the information updating means 14. Moreover, the information extracting means 13 inhibits use of the magnetic card 100 when the amount of money information cannot be extracted and the extracted amount of money information is zero.

The information updating means 14 outputs the amount of money information input thereto and receives the updated information depending on the use. In this embodiment, for example, when the amount of money information supplied from the information extracting means 13 is ¥3000, the money paid for the shopping is ¥1200, the amount of money information ¥1800 is received as the updated information and this information is supplied to the recording information generating means 15.

The recording information generating means 15 generates a recording information by adding a header and an error correction code to the amount of money information supplied. The generated recording information is then supplied to the spectrum spread signal generating means 16.

The spectrum spread signal generating means 16 generates the spectrum spread signal depending on the amount of money information in the recording information by the spectrum spreading of the recording information. In this case, the PN code stream used for the spectrum spread in the spectrum spread signal generating means 16 is same in the series but is different in the phase from the PN code stream which has been used for generating the spectrum spread signal corresponding to the initialized information and amount of money information recorded previously in the magnetic card 100.

In this embodiment, for example, phase of the PN code stream used for the spectrum spread is changed depending on the number of times of update. Thereby, it is now possible for the recording to superimpose the spectrum spread signal corresponding to the updated amount of money information to the spectrum spread signal recorded previously in the magnetic card 100.

Namely, as shown in FIGS. 8A to 8E, the PN code stream PS0 shown in FIG. 8C is generated on the basis of the timing signal (FIG. 8A) and the clock signal (FIG. 8B) synchronized with the timing signal. The PN code stream PS1 is generated by shifting the PN code stream PS0 for one clock and the PN code stream PS2 is generated by further delaying one clock. As explained above, the PN code streams having the delayed phases can be generated.

In this embodiment, for example, the spectrum spread signal corresponding to the initialized information is generated by using the PN code stream PS0 of which phase is not shifted as the initialized information in the recording medium initializing apparatus 20. The initial value of the amount of money information is spectrum spread using the PN code stream PSI obtained by shifting the phase of the PN code stream PS0 for one clock and when the amount of money information is updated, the updated amount of money information is spectrum spread using the PN code stream after the PN code stream PS2 of which phase is further shifted depending on the updated amount of money information.

As the number of times of update, the latest number of times of update is detected depending on the phase of the PN code spectrum spreading the recorded amount of money information when the spectrum spread signal is detected in the spectrum spread signal detecting means 12 as explained above and such latest information is then notified to the spectrum spread signal generating means 16. Thereby, the phase of the PN code stream used for the spectrum spread in the spectrum spread signal generating means 16 can be determined.

As explained above, the spectrum spread signal depending on the updated amount of money information generated in the spectrum spread signal generating means 16 is supplied to the adding means 17.

The adding means 17 superimposes the spectrum spread signal generated in the spectrum spread signal generating means 16 to the signal read from the magnetic card 100 by means of the reading means 11 and then supplies the signal to the signal recording means 18.

The signal recording means 18 records the signal supplied from the adding means 17 to the magnetic card 100. Thereby, as shown in FIG. 9, the initialized information, amount of money information as the initial information and amount of money information updated for each use of the magnetic card 100 are respectively spectrum spread and are superimposed as the spectrum spread signal for the purpose of recording in the recording region of the magnetic card 100.

As explained, a signal in which a plurality of pieces of information are superimposed can be formed by spectrum spreading the amount of money information using the PN code streams in different phases and then superimposing these pieces of information. Accordingly, the updated latest information can be accumulated for recording together with the old information without erasing the old information recorded previously in the magnetic card 100.

Therefore, when the update process is executed to the magnetic card 100 by the information recording and updating apparatus 10 of this embodiment, the spectrum spread signal corresponding to the initialized information and the old update history recorded in the magnetic card in the recording medium initializing apparatus 20 are not erased. Moreover, as explained previously, the initialized information may be recorded only in the recording medium initializing apparatus and cannot be written by the information recording and updating apparatus 10 or the other updating apparatus.

However, when the altered amount of money information, for example, is over-written on the recording medium, the initialized information is erased by the newly written information. Therefore, the magnetic card can be judged whether it is the card where information is altered or not depending on existence of the initialized information.

Therefore, since the process for disabling use can be executed for a magnetic card which is not formed regularly by the recording medium initializing apparatus 20 and a magnetic card where recorded information has been altered, wrong use of the magnetic card having probability of alteration of information can be prevented effectively.

As explained previously, since the old amount of money information recorded previously in the magnetic card 100 is not erased and the updated new data is additionally recorded thereto in the magnetic card 100, the history of use of the magnetic card 100 can also be extracted. As explained, since the old amount of money information is still left, alteration of the amount of money information is difficult. That is, as explained previously, even if the amount of money information is altered by obtaining improperly the information recording and updating apparatus to illegally alter the software, when mismatching is detected in the history of update in the past, the relevant magnetic card can be judged as a card in which information has been altered.

For example, in this embodiment, each time when the magnetic card 100 is used and the amount of money information is updated, the amount of money information is spectrum spread by the PN code streams having different phases depending on the number of times of update.

In this case, if mismatching is generated in the amount of money information recorded, for example, there is no amount of money information which shall be recorded or the amount of money information updated this time is larger than the amount of money information after the preceding update, the information recorded in this magnetic card is judged as altered information and the process for disabling the use of the relevant magnetic card can be executed.

The process for disabling the use of card suggests the process for preventing the use of magnetic card having probability of alteration of information, for example, not only that use of such magnetic card is inhibited as explained by suspending the demodulation of the spectrum spread signal but also the magnetic card inserted into the information recording and updating apparatus 10 is not returned and collected, alarm tone is generated or alarm message is displayed.

[Explanation of Operations of the Information Recording and Updating Apparatus]

Next, operations of the information recording and updating apparatus 10 explained above will then be explained with reference to the flow chart of FIG. 10. The flow chart of FIG. 10 is prepared for mainly explaining the operations of the spectrum spread signal detecting means 12 of the information recording and updating apparatus 10.

Figure 10:
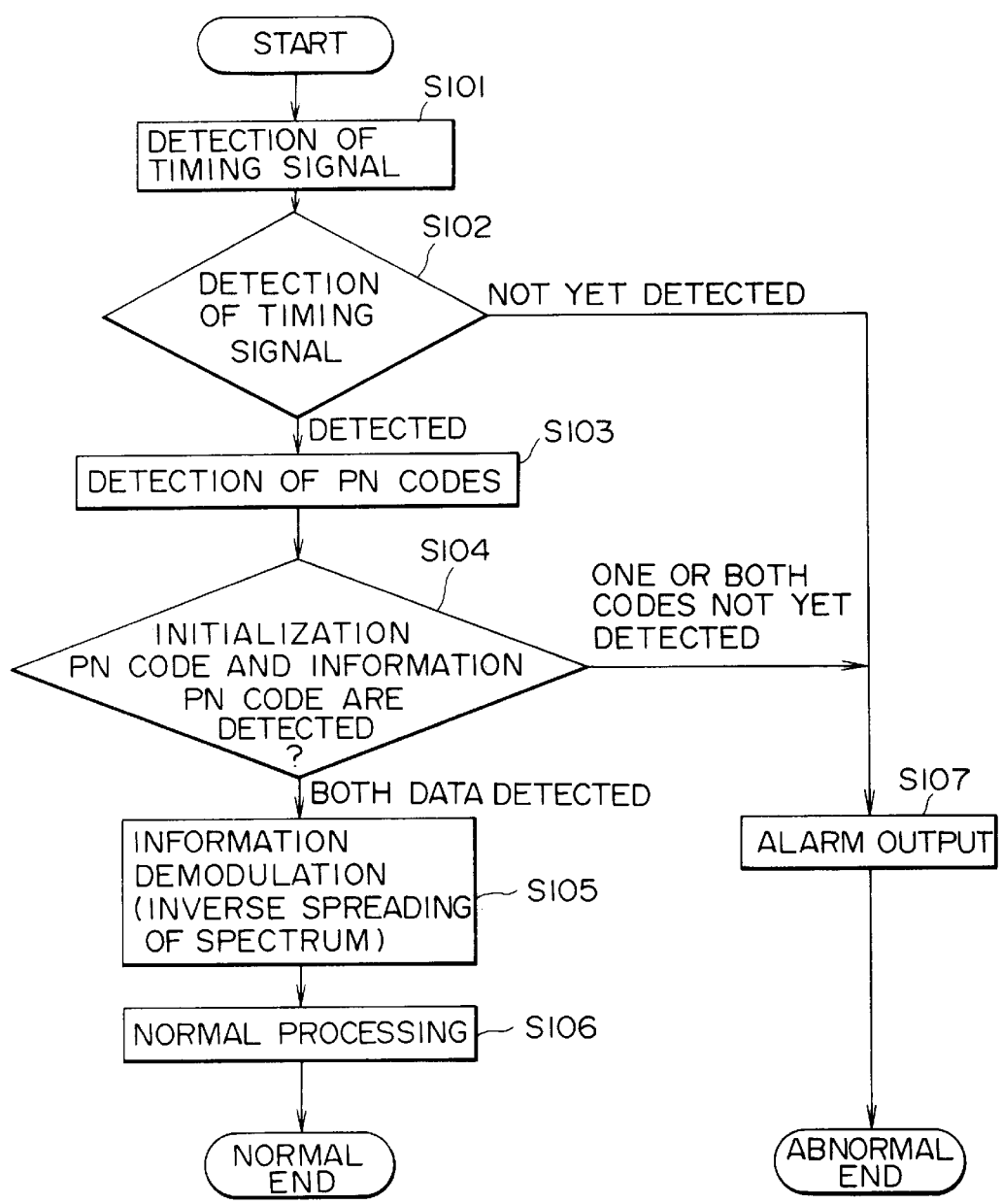
FIG. 10 is a flowchart for explaining operations of the information recording and updating apparatus shown in FIG. 2.

When the magnetic card 100 is inserted into the information recording and updating apparatus 10, signals recorded in the magnetic card 100 are read and such signals are then supplied to the spectrum spread signal detecting means 12, the spectrum spread signal detecting means 12 starts the process shown in FIG. 10.

First, the spectrum spread signal detecting means 12 detects the timing signal from the signal supplied (step S101) Next, whether the timing signal is detected or not is judged (step S102).

When detection of the timing signal is judged in the judging process of the step S102, the PN code stream is generated on the basis of the detected timing signal and this PN code is used to detect the PN code stream in the signal read from the magnetic card 100 (step S103).

In the step S103, the PN code stream as the initialized information written at the time of initialization by the recording medium initializing apparatus 20 and the PN code stream spectrum spreading the amount of money information are detected. Here, the amount of money information means both the amount of money information recorded as the initial value by the recording medium initializing apparatus 20 and the updated amount of money information recorded by the information recording and updating apparatus 10.

Next, the spectrum spread signal detecting means 12 judges whether both PN code stream as the initialized information and the PN code stream spectrum spreading the amount of money information are detected or not in the detecting process in the step S103 (step S104).

When detection of both PN code streams is judged in the step S104, the inverse spectrum spread is performed using the PN code stream generated on the basis of the timing signal to demodulate the information which has been spectrum spread and recorded in the magnetic card 100 (step S105).

In the information demodulating process in the step S105, all pieces of information recorded in the magnetic card 100 in such a manner that these are superimposed as the spectrum spread signals as explained previously are demodulated and detected.

The information recording and updating apparatus 10 executes the ordinary processes (step S106). Namely, it extracts the smallest amount of money information (amount of money information in which the number of times of update is largest) from the detected amount of money information as explained previously, updates the amount of money information depending on use, forms recording information including the updated amount of money information, executes the spectrum spread for the recorded information to record the recording information including the updated amount of money information to the magnetic card 100 as the spectrum spread signal. Thereby, the process shown in FIG. 10 is completed.

Moreover, if the timing signal is judged to be not detected in the process of step S102 and both PN code stream corresponding to the initialized information and PN code stream spectrum spreading the amount of money information are not detected in the process of step S104, the magnetic card 100 inserted into the information recording and updating apparatus 10 is judged as a card not regularly generated or as a card in which altered information is recorded and a process for disabling the use is executed by issuing an alarm tone to suspend the updating process (step S107). Thereby, the process shown in FIG. 10 is completed.

As explained above, the updated latest information can be superimposed and recorded in the magnetic card without erasing the old information recorded in the card by using the information recording and updating apparatus 10 of the present embodiment.

Therefore, since the initialized information recorded by the recording medium initializing apparatus 20 is never erased, the card may be judged whether it is magnetic card generated regularly or a card where altered information is recorded depending on existence of the initialized information.

Moreover, the spectrum spread signal detecting means 10 of the information recording and updating apparatus 12 detects the PN code used for generation of the spectrum spread signal to detect whether the spectrum spread signal is included or not in the information supplied.

However, when the PN code stream is generated in the same timing as the PN code stream used for generation of the spectrum spread signal with the timing signal, detection of the PN code stream is not executed and the inverse spectrum spread is performed to demodulate the information to judge whether the subsequent process should be executed or not depending on the existence of the target information.

In the process explained with reference to FIG. 10, whether the magnetic card may be used or not is judged depending on existence of the initialized information and the amount of money information, but as explained above, whether the magnetic card can be used or not can be judged by detecting mismatching in the amount of money information (history of update) superimposed for additional recording as explained above.

[Modification Example]

In the embodiment explained above, the initialized information, initial value of the amount of money information and updated amount of money information are spectrum spread to generate the spectrum spread signal and the signal superimposing a plurality of spectrum spread signals is formed and then it is recorded in the magnetic card.

However, when the level of each spectrum spread signal is constant, it is possible to improperly use the magnetic card by removing the spectrum spread signal corresponding to a small mount of money (remaining money) after the repeated update from the signal recorded in the magnetic card.

For example, the spectrum spread signal corresponding to the information of the smallest amount of money after the repeated update is detected using a sliding correlator and a cancellation signal is generated in the same level and same phase as the above signal. Therefore, it may be possible to erase further updated amount of money information by subtracting such cancellation signal from the signal which is recorded in the magnetic card in such a form that a plurality of spectrum spread signals are superimposed.

Therefore, in this example of modification, the power level of the spectrum spread signal is changed at random to disable generation of the canceling signal to cancel the spectrum spread signal recorded in the magnetic card.

Figure 11:
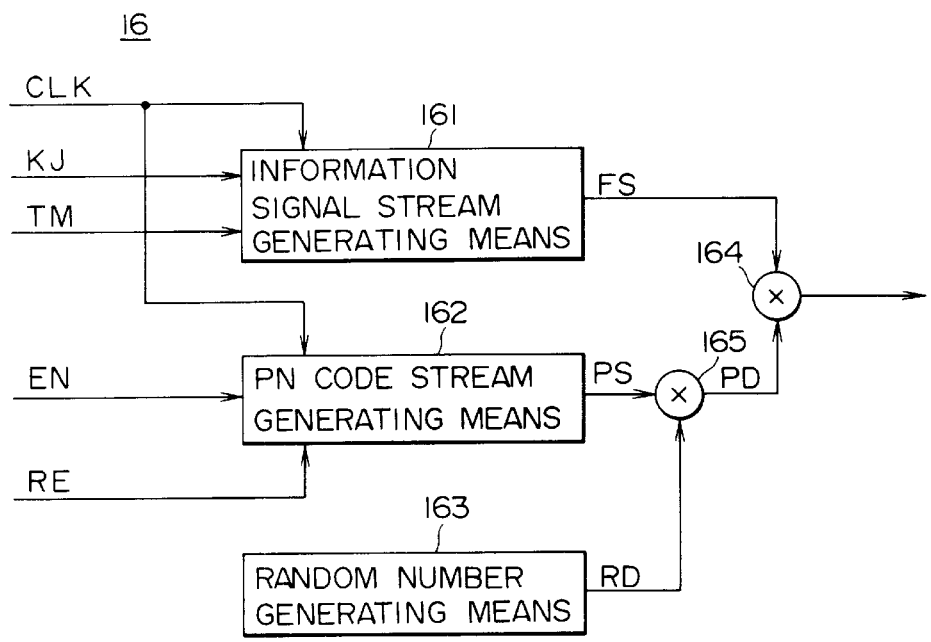
FIG. 11 is a block diagram for explaining an example of the spectrum spread signal generating means when a level of the spectrum spread signal is varied.

FIG. 11 is block diagram for explaining an example of the structure of the spectrum spread signal generating means 22 of the recording medium initializing apparatus 20 and the spectrum spread signal generating means 16 of the information recording and updating apparatus 10 explained previously.

As shown in FIG. 11, the spectrum spread signal generating means 16, 22 is provided with an information signal stream generating means 161, a PN code stream generating means 162, a random number generating means 163 and multiplying means 164, 165.

As shown in FIG. 11, a clock signal CLK, an amount of money information KJ as the initial value and a timing signal TM are supplied to the information signal stream generating means 161. In this case, the timing signal TM indicates, for example, the isolation timing in every one bit of the amount of money information KJ. The information signal stream generating means 161 outputs the amount of money information KJ in every one bit as much as the predetermined number of clocks to generate the information signal stream FS and then supplies this signal to the multiplying means 165.

A clock signal CLK, an enable signal EN and a reset signal RE are supplied to the PN code stream generating means 162. The enable signal EN activates the PN code stream generating means 162. In this embodiment, this enable signal EN is generated when the power is supplied to the recording medium initializing apparatus 20 and information recording and updating apparatus 10 and is then supplied to the PN code stream generating means 162. Moreover, the reset signal RE is the timing signal for generating, from its heading code, the PN code stream having the predetermined code pattern.

The PN code stream generating means 162 is activated depending on the enable signal EN. The PN code stream generating means 162 generates the PN code stream PS based on the clock signal CLK in the timing when the reset signal RE is supplied and then supplies this PN code stream PS to the multiplying means 164.

Figure 12A:
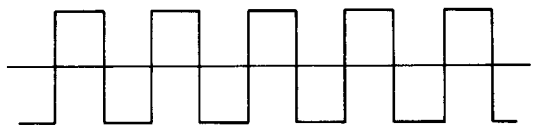
FIGS. 12A and 12B are diagrams for explaining the step for changing at random the power of the spectrum spread signal.

In this embodiment, the PN code stream generating means 162 generates the M series code which is generated at random without deviation in the code "1" and code "0" and converts the level of the generated code "0" to the code "−1" to. generate the PN code stream PS (FIG. 12A) consisting of the code "1" and the code "−1".

The random number generating means 163 generates a random number RD expressed by two bits, for example, in every desired timing and then supplies this random number to the multiplying means 164.

Figure 12B:
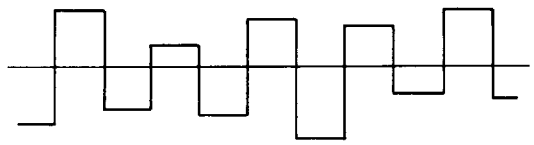

The multiplying means 165 uses the random number RD to generate the PN code stream PD (FIG. 12B) obtained by changing at random the level of the PN code stream PS and then supplies this code stream to the multiplying means 164. In this embodiment, the PN code stream PS is composed of the code "1" and the code "−1" as explained above. Therefore, the code "1" is caused to change its level in the positive direction while the code "−1" is caused to change its level in the negative direction with the random number RD.

The multiplying means 155 executes the spectrum spread for the anti-duplication control signal stream FS using the PN code stream PD of which level is changed at random. Thereby, the spectrum spread signal corresponding to the amount of money information of which level is changed at random can be formed.

As explained above, in this embodiment, the PN code stream PD is generated by changing at random the level of the PN code stream PS generated by the PN code stream generating mean 162 using the random number RD, and the level of spectrum spread signal is changed at random by using this PN code stream PD. Therefore, the random number generating means 163 generates the random number RD in every timing for changing in very small step the level of the PN code stream PS.

Thereby, unless the random number RD used for changing the level of the spectrum spread signal is changed, variation of level of the spectrum spread signal cannot be detected and the spectrum spread signal corresponding to the amount of money information after the latest update cannot be removed from the information recorded in the magnetic card.

In this case, the spectrum spread signal changes only its level at random and does not change its code pattern or series of the PN code stream used for generation of the spectrum spread signal.

Therefore, at the time of the inverse spectrum spread, the information formed as the spectrum spread signal can be demodulated by executing the inverse spectrum spread using a PN code stream which is the same as the PN code stream before the level is changed at random without receiving a large influence on variation of the level of the spectrum spread signal.

Moreover, at the time of the inverse spectrum spread, it is not required to discriminate or reproduce the random number RD used for changing the level of the spectrum spread signal. Therefore, a desired random number RD may be used.

Here, it is also possible to generate a random number based on noise, for example, generated in the recording medium initializing apparatus 20 and information recording and updating apparatus 10. In short, any random number, if it does not show any regularity and reproducibility, may be used as the random number for changing at random the level of the spectrum spread signal.

Moreover, the random number RD generated is enough when it is expressed by two or more bits and is not limited to the number expressed by two bits.

It is also possible to change at random the level of spectrum spread signal formed by the multiplying means 164 using the random number RD by providing the multiplying means 165 shown in FIG. 11 in the stage after the multiplying means 164.

In addition, a random number RD may also be multiplied to the information signal stream FS generated by the information signal stream generating means 161.

In the recording medium initializing apparatus 20 in this embodiment explained above, the PN code stream corresponding to the initialized information indicating that the magnetic card is formed regularly by the initial information apparatus 10 is used as the spectrum spread signal corresponding to the initialized information but the PN code stream is not limited thereto. For instance, the spectrum spread signal corresponding to the initialized information may be generated by setting the predetermined information such as the intrinsic manufacturing number to the recording medium initializing apparatus 20 and then spectrum spreading such information using the PN code stream.

Moreover, in the embodiment explained above, the updated amount of money information is spectrum spread by utilizing the PN code of different phase depending on the number of times of update, but it is not limited thereto and a PN code stream of different phase may be used depending on the amount of money information.

In addition, for example, in the case of generating the PN code streams of different phases in each amount of money, these PN code streams of different phases may be used as the spectrum spread signals corresponding to the amount of money information.

As explained above, the spectrum spread signal may be generated by spectrum spreading of the PN code and the PN code stream itself may be used as the spectrum spread signal.

Moreover, in this embodiment explained above, the spectrum spread signal corresponding to the initialized information and the amount of money information is generated using the PN codes of the same series but in different phase and these signals are superimposed but it is not limited thereto.

For example, the spectrum spread signal corresponding to each information may be generated using a PN code of a different series depending on the initialized information and amount of money information. In addition, the spectrum spread signal corresponding to each information may also be generated using a plurality of spread codes formed by a plurality of different orthogonal codes and PN code.

Furthermore, in this embodiment, the PN code stream spectrum spreading the spectrum spreading signal can be detected quickly by superimposing the timing signal with the spectrum spread signal, but it is also possible that the timing signal is removed.

When the timing signal is not used, a sliding correlator maybe used at the time of detecting the spectrum spread signal to detect the PN code spectrum spreading the spectrum spread signal.

Moreover, in the embodiment explained above, the amount of money information is used as the information signal in the prepaid card, but it is not limited thereto For example, the present invention can also be applied to the prepaid card where the available metering rate may be used as the information signal.

Meanwhile, the magnetic card is not limited to a prepaid card and the present invention can also be applied to various magnetic cards in which information is magnetically recorded and such recorded information is read.

Moreover, in this embodiment, a magnetic card is used as a recording medium but the medium is not limited only to a magnetic card and the present invention can be applied to various kinds of recording medium where information is magnetically recorded.

In above embodiment, the PN code is used as the spread code but it is not limited thereto and various kinds of spread codes such as the code of the Gold code series may be used.

As explained previously, according to the present invention, since the information signal is spectrum spread and is recorded in the recording medium, it is difficult to detect this signal and then improperly alter. Thereby, alteration of the information signal can be prevented.

Moreover, since the spectrum spread information signal is recorded in such a manner the it is superimposed on the information previously recorded in the recording medium, the old information recorded previously is not erased and the updated latest information may be superimposed on the old information to achieve additional recording in the recording medium.

The spectrum spread signal corresponding to the initialized information is superimposed on the spectrum spread signal corresponding to the information signal which is then recorded in the recording medium by the initial information setting apparatus Thereby, if the initialized information cannot be detected, use of such recording medium is disabled, for example, to prevent use of the recording medium wherein the recorded information is altered.

Moreover, since power level of the spectrum spread signal corresponding to the information signal is changed at random, it is almost impossible to remove the spectrum spread signal recorded in the recording medium.

In addition, the spread code used for generation of the spectrum spread signal can be detected easily by recording the spectrum spread signal and the timing signal indicating the timing for starting generation of the spread code used for generation of the spectrum spread signal. Therefore, inverse spectrum spread can be started quickly.

What is claimed is:

1. An information recording and updating method comprising the steps of:
    reading a signal recorded in a recording medium;
    detecting a spectrum spread information from said signal read by said reading step;
    updating said information detected by said detecting step;
    generating a spectrum spread signal corresponding to said information updated by said updating step;
    superimposing said spectrum spread signal generated by said spectrum spread signal generating step on said signal read by said reading step and producing a superimposed signal; and
    recording said superimposed signal formed by said superimposing step in said recording medium.

2. An information recording and updating method according to claim 1 further comprising the step of recording initialized information, which can be written only by an initializing apparatus, in said recording medium at a time of initialization by said initializing apparatus.

3. An information recording and updating method according to claims 1 or 2 further comprising the steps of:

determining whether said recording medium is a regular or irregular medium depending on a history of update obtained from said information detected in said detecting steps; and disabling use of said recording medium if said recording medium is determined to be an irregular medium in said determining step.

4. An information recording and updating method according to claim 2 further comprising the step of disabling use of said recording medium if said initialized information is not detected in said detecting step.

5. An information recording and updating method according to claim 1 further comprising the step of changing a power level of said spectrum spread signal generated in said spectrum spread signal generating step using a desired random number.

6. An information recording and updating method according to claim 1 further comprising the step of:

generating a timing signal indicating a timing for starting generation of a spread signal used for detection of said spectrum spread signal; and superimposing said timing signal on said signal to be recorded in said recording medium.

7. An information recording and updating apparatus comprising:

reading means for reading a signal recorded in a recording medium;

detecting means for detecting spectrum spread information from said signal read by said reading means;

updating means for updating said information detected by said detecting means;

spectrum spread signal generating means for generating a spectrum spread signal depending on said information updated by said updating means;

superimposing means for superimposing said spectrum spread signal generated by said spectrum spread generating means on said signal read by said reading means; and recording means for recording the signal from said superimposing means in said recording medium.

8. An information recording and updating apparatus according to claim 7, wherein initialized information which can be written only with an initializing apparatus is recorded at a time of initialization to said recording medium by said initializing apparatus.

9. An information recording and updating apparatus according to claim 7 further comprising:

discriminating means for determining whether said recording medium is a regular medium or irregular medium depending on a history of update obtained from said information detected by said detecting means; and control means for disabling use of said recording medium if said recording medium is determined to be an irregular medium by said discriminating means.

10. An information recording and updating apparatus according to claim 8 further comprising control means for disabling use of said recording medium if said initialized information is detected by said detecting means.

11. An information recording and updating apparatus according to claim 7 further comprising level changing means for changing a power level of said spectrum spread signal generated by said spectrum spread signal generating means using a desired random number.

12. An information recording and updating apparatus according to claim 7 further comprising means for generating a timing signal indicating a timing for starting generation of a spread code used for detection of said spectrum spread signal, and wherein said timing signal is superimposed on said signal to be recorded in said recording medium.

13. An information recording and updating system composed of a recording medium initializing apparatus for initializing a recording medium and an information recording and updating apparatus for updating an information signal recorded in said recording medium, said recording medium initializing apparatus comprising:

recording means for recording in said recording medium a spectrum spread signal containing initialized information which cannot be written by said information recording and updating apparatus; and said information recording and updating apparatus comprising:

reading means for reading a signal recorded in said recording medium;

detecting means for detecting spectrum spread information from said signal read by said reading means;

updating means for updating said information detected by said detecting means;

spectrum spread signal generating means for generating a spectrum spread signal depending on said information updated by said updating means;

superimposing means for superimposing said spectrum spread signal generated by said spectrum spread signal generating means on said signal read by said reading means;

and recording means for recording the signal from said superimposing means in said recording medium.

* * * * *